March 9, 1965    A. R. NORDEN    3,172,592
INTERMITTENT STRIP-FEEDING DEVICE
Filed Jan. 2, 1962    2 Sheets-Sheet 1

INVENTOR.
ALEXANDER R. NORDEN
BY
Paul S. Martin
ATTORNEY

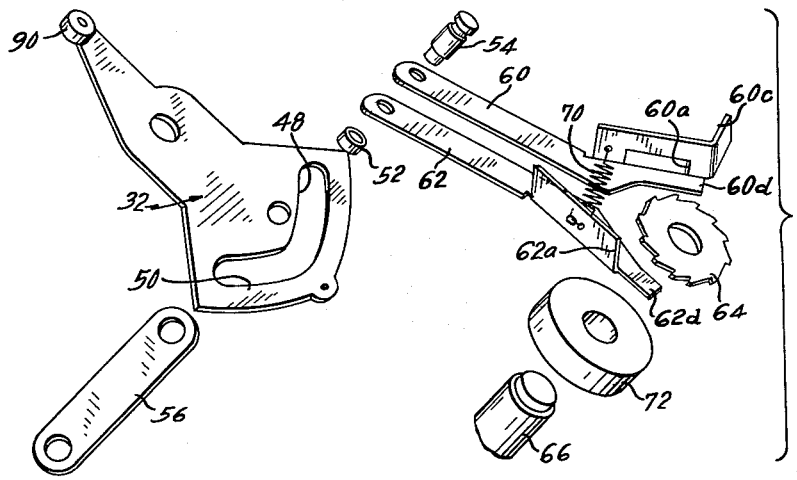
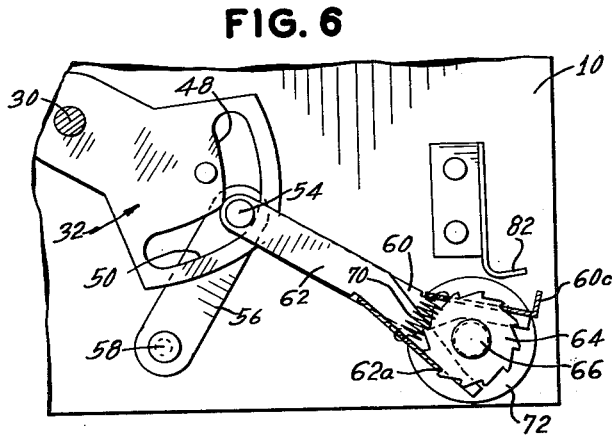
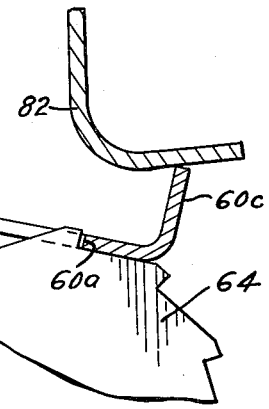
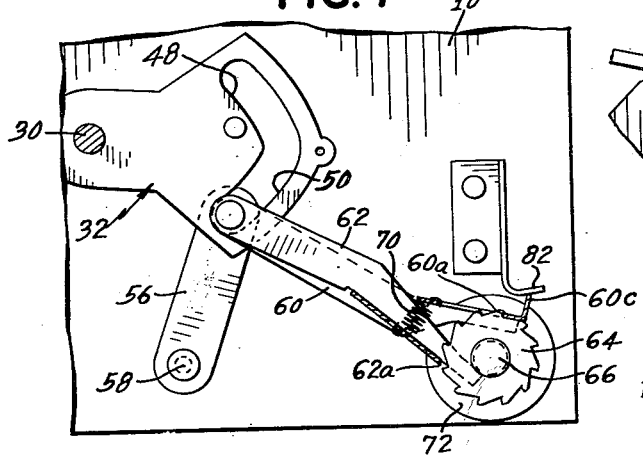

United States Patent Office 3,172,592
Patented Mar. 9, 1965

3,172,592
INTERMITTENT STRIP-FEEDING DEVICE
Alexander R. Norden, New York, N.Y., assignor to American Foto Patrol Inc., a corporation of New York
Filed Jan. 2, 1962, Ser. No. 163,393
11 Claims. (Cl. 226—157)

The present invention relates to intermittent strip-feeding and rewinding or take-up mechanisms, particularly for advancing film in a camera.

An important feature of the present invention resides in the provision of a novel film-feeding mechanism operated by an electromagnet for advancing film one "frame" at a time. The term "frame" is used here to refer to the length of film used in each picture-taking operation, which does not necessarily equal the standard moving-picture size of an exposure.

An electrically operated film feeder forms an important part of an automatically operable camera, useful for taking large numbers of "stills" or individual photographs on strip film of the form ordinarily used in moving-picture cameras. Through use of an electromagnet, it becomes possible to avoid the complexities and manufacturing cost involved in use of inevitably high-speed electric motors, reduction gearing and single-frame control means that would otherwise be needed to advance the film one frame at a time after each "still" is taken.

A related object of the invention resides in providing a coordinated sprocket driving mechanism and take-up means for feeding strip-film, all operable by a reciprocating actuator, especially an electromagnet.

A further object of the invention resides in the provision of an electromagnet-operated mechanism for driving a film feeding sprocket and, more particularly, for providing firm film-advancing pull by the sprocket at different portions of the operating stroke of the electromagnet. A further object resides in providing a novel electromagnet-actuated mechanism for operating a film-feeding sprocket through a relatively large part of a revolution.

The illustrative embodiment of the invention described in detail below is well suited to achieve the foregoing and other objects, and has various important features and advantages as will more fully appear from the detailed description. As will be seen, this embodiment utilizes a rotary solenoid that operates through a relatively small angle such as 45 degrees, and actuates a ratchet-and-dual-pawl mechanism to drive a sprocket through a relatively large angle such as 120 degrees. In this way, a large frame-length of film can be advanced by the sprocket without resort to an over-size electromagnet. Four forward feeding steps are effected by the mechanism. Two of these feeding steps are effected during the power stroke of the electromagnet and two more are effected during the time taken in the return motion of the solenoid. Spreading the film-feeding effort over a longer time in this way reduces the stress that would be imposed on the film if, for example, only the forward stroke of the electromagnet were utilized. The speed of film travel is also reduced, and, accordingly, there is correspondingly reduced need to accelerate unwinding rotation of the supply reel of film to provide a fresh frame of film.

The feeding of film proceeds during the return stroke of the electromagnet, which is the time that the take-up reel is operated. Take-up winding thus occurs, to a degree, at the same time that slack is developing. At the end of the sprocket-feeding stroke, the take-up reel tends to continue rotation, and this might introduce irregularity in the film-feeding steps. To prevent this, a sprocket-lock is included that becomes locked and unlocked as required alternately, to allow feeding of the film and to assure prevention of over-feeding, reliably and without undue complexity. This is achieved by providing a locking part on one of the pawls that becomes wedged between a ratchet on the sprocket and a stationary abutment, as that pawl completes the final film-advancing step. The locking part is lifted out of its locking position during the start of the next feeding operation, in the normal operating stroke of the pawl.

The foregoing novel features and objects, and certain others, will be more fully appreciated as the detailed description proceeds. In the description, reference is made to the accompanying drawings forming part of the disclosure of the illustrative embodiment.

In the drawings:

FIG. 5 is an exploded perspective view of a portion of the mechanism in FIG. 1;

FIGS. 6 and 7 are fragmentary elevations, partly in section, of a portion of the mechanism in FIG. 1 at successive phases of the operation of that mechanism; and FIG. 8 is a greatly enlarged detail of the mechanism in both FIGS. 1 and 7.

Figure 3:
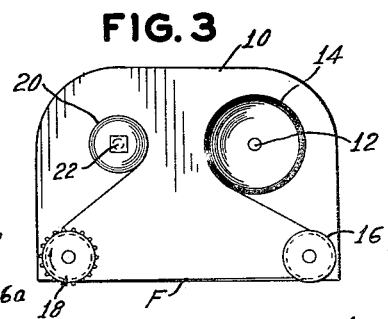
FIG. 3 is the opposite-side elevation of the embodiment in FIG. 1, FIG. 3 being drawn to reduced scale.

Referring now to the drawings, the feed mechanism in its presently preferred form is seen to include a supporting plate 10, having a fixed shaft 12 for supporting a supply roll 14 of film or the like. This film F passes around an idler 16, and around sprocket 18 to a takeup roll 20 that is keyed to a square takeup shaft 22. The assembly in FIG. 3 is particularly arranged as a feed assembly for a camera. In that application, an exposure is made on the sensitive surface of the film, midway between idler 16 and sprocket 18. By means of a mechanism to be described, a fixed length of film is advanced in each of a succession of film-feeding strokes so as to present successive areas of the film at the exposure plane of the camera. The film is drawn from supply roll 14 by operation of sprocket 18; and a mechanism is provided that winds the film delivered by sprocket 18 in coordination with the sprocket drive.

Figure 1:
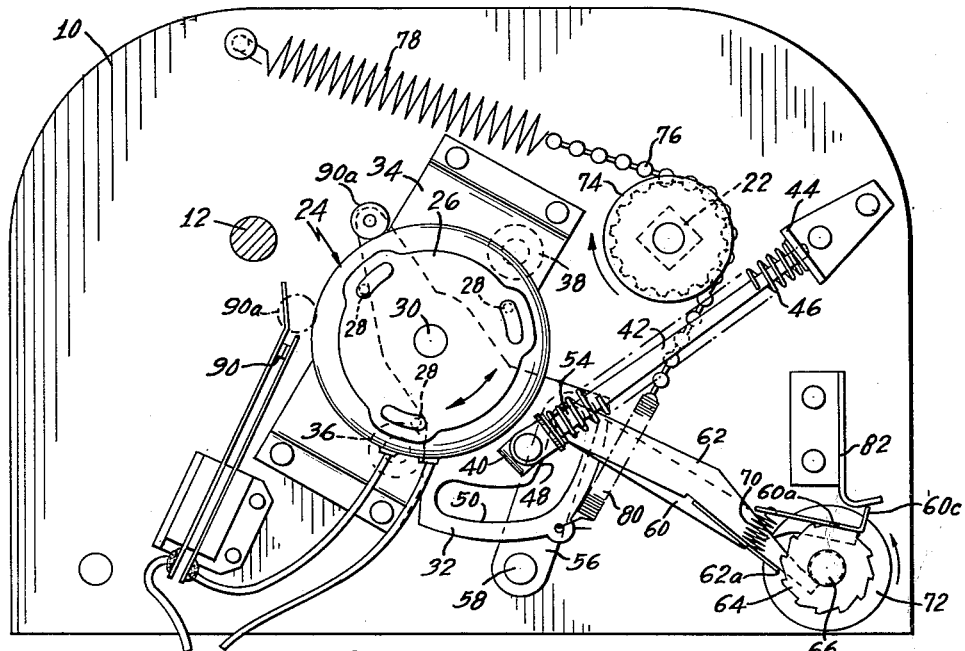
FIG. 1 is an elevation of an illustrative embodiment of the invention.
Figure 2:
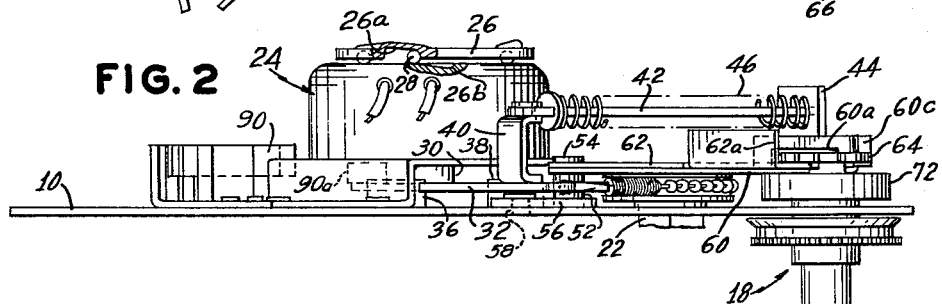
FIG. 2 is the bottom plan view of the embodiment in FIG. 1.

As seen in FIGS. 1 and 2, the film feeding mechanism includes a rotary solenoid 24 having a cam plate 26 in which there is formed a series of three slant tracks or cam surfaces 26a containing three captive ball-bearings 28, and these, in turn, cooperate with slant tracks 26b in the solenoid housing. Rotary solenoid 24 includes a coil and an axial armature (not shown) which apply a powerful axial thrust to plate 26, acting downward as viewed in FIG. 2 when the coil is energized. This reacts with the ball-and-track arrangement to produce a strong rotary torque. The solenoid thus tends to move actuator 26 counter-clockwise (as viewed in FIG. 1) through an angle of about 45 degrees in the illustrated unit. Extending axially through the rotary solenoid is a shaft 30 that is united to a plate 32 at the opposite end of the shaft. Solenoid 24 is mounted on a bridge 34 spaced from but fixed to plate 10, and plate 32 works between bridge 34 and the main plate 10 of the feed mechanism. The arcuate travel of plate 32 is limited by bumpers or stops 36 and 38, as of nylon, fastened to plate 10.

A bracket 40 is fixed to plate 32 and extends upward from that plate. A rod 42 is pivoted to the top of bracket 40, and extends through a slot in a fixed bracket 44. Rod 42 forms a guide for compression spring 46 that is confined between fixed bracket 44 and abutment shoulders at the pivoted end of rod 42.

When the rotary solenoid is energized and plate 32 swings counter-clockwise (FIG. 1) into engagement with stop 38, rod 42 swings about its pivot on bracket 40 and slides in the slot through fixed bracket 44. As this occurs, the initial compression in spring 42 increases. However, the effort required of the rotary solenoid does not increase in proportion to the spring compression, because of a mechanical advantage that is provided by the configuration of parts illustrated. Thus, as plate 32 approaches stop 38, the radius 30–40 swings toward alignment with rod 42. Consequently, while the compression in spring 46 increases during this operating stroke, the percentage or component of the force exerted by the spring in the direction resisting the torque of the rotary solenoid is progressively reduced. Consequently, the torque required of the rotary solenoid for building up compression in spring 46 during the active stroke of the solenoid remains nearly level. Correspondingly, during the return stroke of the rotary solenoid after deenergization, spring 46 tends to exert a nearly constant return torque at the different angular positions of plate 32. As will be seen, spring 46 provides returning spring-energy for restoring the rotary solenoid to its initial position following an active stroke, and spring 46 also provides operating effort for the take-up mechanism described in detail below.

Plate 32 includes a two-part cam track including a first cam portion 48 and a second cam portion 50. These cam portions cooperate with a cam follower 52. During the first half of the forward or operating stroke of the solenoid, cam follower 52 moves radially away from shaft 30; and during the second half of the forward stroke of the plate 32, cam follower 52 is moved radially inward by cam portion 50. Cam follower 52 is rotatably carried by a headed shaft 54 that is fixed to link 56; and link 56 is secured by pivot 58 to plate 10. Shaft 54 passes through holes in pawls 60 and 62. These pawls shift bodily, both to the right and to the left as viewed in FIGS. 1, 2, 6 and 7, during the forward, active stroke of the solenoid, as cam follower 52 moves along cam portion 48 and then moves along cam portion 50. Pawls 60 and 62 again move to the right and then to the left during the return stroke of actuator plate 32, being driven by spring 46 at this time.

Pawls 60 and 62 work against opposite edges of a ratchet 64. Ratchet 64 is fixed to a shaft 66 that extends through a bearing in plate 10 and forms part of sprocket 18. Spring 70 urges pawls 60 and 62 into cooperation with the opposite edges of sprocket 64. Portions 60d and 62d are confined between sprocket 64 and a bearing wheel 72 on shaft 66.

At the start of the operating stroke of plate 32, pawl edge 62a is spaced slightly to the left of a tooth of sprocket 64. As pawl 62 is shifted to the right, the first sprocket tooth is picked up by pawl edge 62a and is advanced one sprocket-tooth during the travel of cam follower 52 along cam track 48. During this same stroke, ratchet 64 rotates counter-clockwise through an angle corresponding to one ratchet tooth; and pawl 60 moves to the right, idly ratcheting across two teeth of sprocket 64. Thereupon, as cam follower 52 moves along cam portion 50 and both pawls 60 and 62 move to the left, pawl edge 60a (FIG. 5) engages a sprocket-tooth and advances that sprocket-tooth through a one-tooth angle. Pawl edge 62a ratchets idly across two ratchet teeth during this stroke, and at the completion of this motion there is a clearance between pawl edge 62a and the confronting ratchet tooth, such as that illustrated in FIG. 1.

During the spring-return stroke of cam plate 32, driven by spring 46, pawls 60 and 62 are first moved to the right, causing cam portion 62a to advance the sprocket 64 through a one-tooth angle, and the pawls move to the left and pawl edge 60a advances the sprocket another one-tooth angle.

The illustrated sprocket has 12 teeth, and because each solenoid actuation and return-spring operation of cam plate 32 causes four one-tooth advances of ratchet 64, it follows that sprocket 18 is driven through a 120-degree angle.

As was previously mentioned, the film that is drawn about sprocket 18 is wound on a take-up roll on shaft 22. This shaft has a round portion that is rotatably mounted in plate 10, and at the back of plate 10 (FIG. 1), shaft 22 carries a sprocket 74. This sprocket has a series of pockets that are complementary to the beads of a bead-chain 76 that is tensioned about sprocket 74, occupying a substantial angle of approximately 120 degrees. At one end of chain 76 there is a long and relatively weak or soft spring 78. The remote end of this spring is fixed to plate 10. At the other end of bead-chain 76 there is a shorter and relatively firmer coil spring 80 whose remote end is fixed to cam plate 32. During the active stroke of the rotary solenoid, cam plate 32 moves counter-clockwise (FIG. 1). During this motion, spring 80 actually exerts thrust. This thrust propels the immediately adjacent section of the ball chain in the axial direction of the spring, and throws the beads out of their pockets in sprocket 74. Spring 78, which is at all times under some tension, draws chain 76 idly across the pockets of sprocket 74. The balls of the chain ratchet in and out of the pockets in the sprocket. During the spring return of cam plate 32, spring 80 firmly draws bead-chain 76 across sprocket 74. Spring 78 tends to keep the beads of the chain in the pockets. Strong driving torque for sprocket 74 is thus provided in the clockwise direction as viewed in FIG. 1. This rotates take-up roll 20 counter-clockwise (FIG. 3), in the direction to wind the film that is advanced by sprocket 18.

The angular rotation of shaft 22 for each one-frame advance of the film varies in dependence on the diameter of the take-up roll. It is normal for the slack in the film to be taken up before plate 32 completes its return stroke. After the sprocket 74 has been arrested by the taut film, spring 80 is simply stretched.

In the next active stroke of the solenoid when energized, plate 32 moves counter-clockwise, and the tension in spring 80 is first relaxed. Thereafter spring 78 is effective to ratchet the bead-chain idly about the sprocket in preparation for the ensuing active stroke of this take-up drive. This take-up mechanism is more fully described in my copending application, Serial No. 102,225 filed April 11, 1961, now Patent No. 3,143,310.

It is apparent that the take-up mechanism develops tension in the film; and this tension is accentuated by the rotation of the take-up roll of film whose inertia applies a pull to the film, the inertia pull increasing as the size of the take-up roll increases. This might cause over-travel of sprocket 18, in excess of the four-tooth advance of sprocket 64 produced by pawls 60 and 62. The following means is provided for preventing any such over-travel of the film, beyond that length of film which is intentionally advanced by the sprocket-and-pawl mechanism.

Pawl 60 has a lateral extension 60c which cooperates with a relatively stiff leaf-spring member 82 fixed to plate 10. At the end of each return stroke of cam plate 32, pawl extension 60c is confined by member 82 (FIG. 8) so as to press pawl 60 against the side face of the next adjacent sprocket-tooth. Sprocket 18 cannot be rotated beyond this point because the sprocket cannot deflect pawl 60 against the restraint applied by member 82. This restraint is relatively positive, far more than sufficient to overcome any tendency of the film to overfeed due to effects at the take-up reel. However, if it should be desired, sprocket 18 can be forcibly rotated, leaf-spring member 82 yielding under such circumstances.

The foregoing locking arrangement does not interfere in any way with the normal operation of the pawl-and-sprocket advancing mechanism. It will be appreciated that, as soon as pawl 62 picks up and starts to advance the sprocket, pawl portion 60c has also been shifted to the right and moves along an outward sloping portion of element 82 that is spaced a greater distance from the sprocket axis and thus allows the sprocket teeth to slip past pawl 60 as the sprocket is rotated by pawl 62.

The mechanism described utilizes a solenoid having a relatively small angular stroke (45 degrees, for example) and effects a 120-degree rotation of sprocket 18. The same solenoid that operates the sprocket-rotating mechanism is also utilized to provide takeup-drive energy for the take-up reel. The mechanism described has been found, in practice, to be highly durable and reliable, and achieves accurate measured film-advance stroke without resort to unduly critical dimensions and tolerances in the parts involved.

Figure 4:
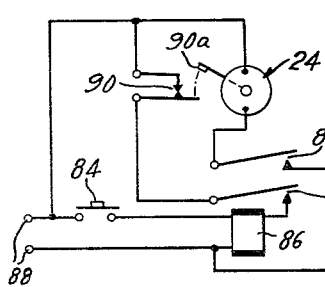
FIG. 4 is the wiring diagram of an operating circuit for the rotary solenoid of the embodiment in FIG. 1.

A suitable circuit for operating rotary solenoid 24 appears in FIG. 4. A push-button 84, when closed, connects the relay winding 86 to direct-current supply terminals 88. When this occurs, relay holding contacts 86a close. A relay holding circuit is established from one of the terminals 88 through relay winding 86, contacts 86a, an additional pair of contacts 90 to the opposite terminal 88. Thus, after momentary closure of push-button 84, relay 86 is energized and remains energized. Energization of relay 86 also closes relay contacts 86b that are in series with the internal winding of rotary solenoid 24. So long as relay 86 is energized, current from terminals 88 flows through contacts 86b and rotary solenoid 24. Cam plate 32 has a rearward extension that carries an insulating button 90a, for engaging and driving open the contacts 90 (FIG. 1). This occurs at the completion of the counter-clockwise, active stroke of cam plate 32, as it is about to strike stop 38. Opening of contacts 90 (FIG. 4) breaks the holding circuit for relay 86, and causes both sets of relay contacts 86a and 86b to open and solenoid 24 is deenergized. Of course it might happen that push-button 84 is held down for too long a period of time. This would simply mean that solenoid 24 would remain energized after its forward operating stroke, and the return stroke of the film-feeding mechanism would then take place upon release of the push-button 84. In any event, exactly one uniform film-feeding stroke results from each depression of push-button 84. It will be appreciated that push-button 84 is purely illustrative, and represents any of a variety of control switching devices that may be found desirable in the larger equipment that utilizes the foregoing film-feeding mechanism.

What is claimed is:

1. A strip feeder including a movable member, an electromagnet for operating said member in a driving stroke and a spring for operating said member in a return stroke, a strip-feeding roller, a ratchet wheel fixed to said roller, a pair of elongated pawls having oppositely directed claws engaging opposite sides of said ratchet wheel and said pawls both extending away from said ratchet wheel toward said movable member, said movable member having a cam, and said pawls having a common cam-follower support, said cam having both forward and return portions effective in successive portions of each stroke of said member to impart both forward and return strokes of reciprocation of said pawls, whereby said ratchet effects four steps of rotation of said roller in response to a driving stroke and a return stroke of said movable member.

2. A film feeder, including an electromagnet having spring return means and having a movable member operable in alternate driving and return strokes, a ratchet wheel, a feed roll operable by said ratchet wheel, a pawl support, means operable by said member for operating said pawl support successively toward and away from said ratchet wheel during each of said strokes of said member, and two elongated pawls carried by said support and having respective oppositely directed claws engaging opposite sides of said ratchet wheel for effecting four indexing steps of said sprocket during each driving-and-return sequence of operations of said movable member.

3. A film feeder including a feed roll, a ratchet fixed thereto, a pair of pawls embracing said ratchet and having oppositely directed ratchet-engaging claws, a support pivotally carrying both said pawls at the ends thereof remote from said claws, an electromagnet having a movable member operable in alternate driving and return strokes, and mechanical coupling means from said movable member to said pawls arranged to reciprocate said pawls through a sequence of back-and-forth strokes during each of said driving and said return strokes of said movable member so as to produce four steps of rotation of said feed roll in response to one sequence of a driving stroke and a return stroke of said movable member.

4. A film feeder including a sprocket, a ratchet wheel fixed to said sprocket, first and second pawls having oppositely directed claws engaging opposite sides of said ratchet wheel and having a common support spaced from said ratchet wheel, reciprocating drive means for operating said common pawl support in forward and return strokes for thereby operating said first pawl and then said second pawl in respective driving strokes, and a stationary stop cooperating with said second pawl in position at the completion of the driving stroke thereof and arranged for resisting lifting of said second pawl away from the axis of the ratchet and thereby resisting sprocket rotation while said second pawl remains in said position.

5. A film feeder including a sprocket, a ratchet wheel fixed to said sprocket, a pawl having a claw cooperable with said ratchet and operable in a forward idle stroke and then in a return ratchet-wheel-operating stroke, and a locking member having a portion closely spaced from said ratchet wheel and constituting a guide cooperating with said pawl at the completion of said driving stroke to force the pawl laterally against the ratchet wheel for resisting over-travel of said sprocket.

6. A film feeder including a movable member having an actuating electromagnet and having a return spring for operating said member in forward and return strokes, a take-up mechanism operable by said member to wind up film during the return stroke of said member, a feed mechanism including a sprocket for advancing a predetermined length of film, a ratchet wheel fixed to said sprocket, a pawl operable by said movable member to index said ratchet wheel, and a companion stop engaging said pawl at the end of the return stroke of said member for preventing lifting of the pawl away from the axis of said ratchet and thereby blocking rotation of the ratchet and over-travel rotation of said sprocket to resist take-up pull by said take-up mechanism.

7. A film feeder including a reciprocable member, an electromagnet for operating said member through a drive stroke, a return spring connected to said member and arranged to have the stress thereof increased in progressively reduced increments during said drive stroke, a cam on said member and a cam follower cooperating with said cam, a pair of pawls pivoted to said cam follower, a ratchet wheel, said pawls embracing said ratchet wheel and having reverse-slanted claws, a spring tensioned between said pawls for biasing said claws against said ratchet wheel, said cam having successive forward and return pawl-operating portions effective in each stroke of said reciprocable member, a take-up mechanism operable by said reciprocable member during the spring-operated return stroke to wind up film advanced by said sprocket, and a stationary member fixed in relation to the axis of said ratchet wheel and cooperable with one said pawl at the end of each said return stroke to block lifting of said one pawl and thereby blocking over-travel rotation of said ratchet wheel and of said sprocket at the end of the film-advancing operation and, concurrently, at the end of the take-up winding operation.

8. A ratchet-and-pawl mechanism, including a ratchet wheel, a pawl having a claw cooperable with said ratchet and operable in a forward idle stroke and then in a return ratchet-wheel-operating stroke, means for operating said pawl through said forward and return strokes, and a locking member having a portion closely spaced from said ratchet wheel and having wedge-like cooperation with said pawl at the completion of said driving stroke and arranged to confine said pawl laterally against said ratchet wheel for resisting over-travel of said ratchet wheel.

9. A drive mechanism including a movable member, an electromagnet for operating said movable member in a driving stroke and a spring for operating said movable member in a return stroke, a rotationally driven member, a ratchet means fixed to said driven member, a pair of pawls having respective claws engaging said ratchet means, said pawls being arranged to be alternately effective in driving said ratchet means unidirectionally, said movable member having a cam, and a cam-follower having a driving connection to said pawls, said cam having both forward and return portions effective in successive portions of each said strokes of said movable member to impart both forward and return reciprocation of said pawls, whereby four rotational steps of said rotationally driven member result from each sequence of a driving stroke and a return stroke of said movable member.

10. A drive mechanism, including an electromagnet having spring return means and having a movable member operable in alternate driving and return strokes, ratchet means, a rotary driven member operable by said ratchet means, pawl supporting means operable by said movable member successively toward and away from said ratchet means during each of said strokes of said movable member, and two pawls carried by said pawl supporting means and having respective claws engaging said ratchet means and arranged to be effective in alternation to drive said ratchet means for effecting four indexing steps of said rotary driven member during each driving-and-return sequence of operations of said movable member.

11. A drive mechanism including a movable member, an electromagnet for operating said member in a driving stroke and a spring for operating said movable member in a return stroke, a rotationally driven member, a ratchet wheel fixed to said driven member, a pair of pawls having a common movable support and having respective claws biased against said ratchet wheel and arranged to be alternately effective during alternate strokes of said common support for driving said ratchet wheel unidirectionally in successive steps, means constraining said common support to move said pawls in back-and-forth operating strokes relative to said ratchet wheel, and a cam and a cooperating cam follower one of which is on said common support and the other of which is on said movable member, said cam having a rising portion and a declining portion successively cooperating with said cam follower in each stroke of said movable member and said rising and declining portions of said cam being arranged to move the pair of pawls successively in opposite motions in relation to the ratchet wheel in each stroke of said movable member, whereby said ratchet wheel operates through two steps during each driving stroke of the electromagnet and through two more strokes during the return operation of said movable member by said spring.

References Cited by the Examiner
UNITED STATES PATENTS

| | | | |
|---|---|---|---|
| 809,693 | 1/06 | Johnston | 74—107 |
| 2,663,193 | 12/53 | Tucker | 74—152 |
| 2,696,982 | 12/54 | Metzner | 226—76 |
| 2,732,271 | 1/56 | Hanson | 226—157 X |
| 2,845,920 | 8/58 | Bruce. | |
| 2,878,014 | 3/59 | Zeigle et al. | 226—157 X |
| 2,942,486 | 6/60 | Beguin | 74—125 |

ROBERT B. REEVES, *Acting Primary Examiner.*

JOSEPH P. STRIZAK, RAPHAEL M. LUPO, ERNEST A. FALLER, JR., *Examiners.*